United States Patent
Schade

(10) Patent No.: US 7,543,080 B2
(45) Date of Patent: Jun. 2, 2009

(54) DUAL PORT USB INTERFACE

(76) Inventor: Peter Arthur Schade, 744 S. Hillview Dr., Milpitas, CA (US) 95035

( * ) Notice: Subject to any disclaimer, the term of this patent is extended or adjusted under 35 U.S.C. 154(b) by 35 days.

(21) Appl. No.: 10/810,113

(22) Filed: Mar. 25, 2004

(65) Prior Publication Data

US 2004/0260854 A1   Dec. 23, 2004

(51) Int. Cl.
*G06F 3/00*   (2006.01)
(52) U.S. Cl. .......................................... 710/2; 710/62
(58) Field of Classification Search ............ 710/62–64, 710/313, 7–8, 20–21
See application file for complete search history.

(56) References Cited

U.S. PATENT DOCUMENTS

| | | | | |
|---|---|---|---|---|
| 4,833,649 A | * | 5/1989 | Greub | 365/189.06 |
| 5,557,778 A | * | 9/1996 | Vaillancourt | 340/825.02 |
| 5,991,830 A | * | 11/1999 | Beard et al. | 710/18 |
| 6,058,441 A | * | 5/2000 | Shu | 710/100 |
| 6,067,628 A | * | 5/2000 | Krithivas et al. | 713/340 |
| 6,122,676 A | * | 9/2000 | Brief et al. | 710/9 |
| 6,460,094 B1 | * | 10/2002 | Hanson et al. | 710/8 |
| 6,725,302 B1 | * | 4/2004 | Benayoun et al. | 710/62 |
| 6,775,733 B2 | * | 8/2004 | Chang et al. | 710/313 |
| 6,839,771 B1 | * | 1/2005 | Bouchier et al. | 709/253 |
| 2003/0167345 A1 | * | 9/2003 | Knight et al. | 709/249 |

* cited by examiner

*Primary Examiner*—Eron J Sorrell
(74) *Attorney, Agent, or Firm*—Sawyer Law Group, LLP

(57) ABSTRACT

A dual port interface is disclosed comprising a host port and a peripheral port. The host port and the peripheral port are defined using predetermined signals. In a preferred embodiment the dual port interface is used in a network comprising one or more a dual port USB (DPUSB) connectors. By use of the DPUSB interface, both one-to-one and one-to-many network topologies can be created. Use of the DPUSB interface also provides the opportunity of new types of devices such as memory cards and cables that will greatly increase the ease of use of many intelligent electronic devices such as cameras and PDAs.

8 Claims, 7 Drawing Sheets

DUAL PORT USB INTERFACE

RELATED APPLICATIONS

The present invention is related to co-pending U.S. patent application, entitled MEMORY CARD SOCKET USING A DUAL-PORT USB CONNECTOR, Ser. No. 10/811,455, filed on even date herewith, and assigned to the assignee of the present invention.

FIELD OF THE INVENTION

The present invention relates generally to computer systems and particularly to a universal serial bus for computer systems.

BACKGROUND OF THE INVENTION

A universal serial bus (USB) bus is an electronic network specification designed to allow a personal computer (PC) to be connected to multiple electronic devices such as keyboards, mice, personal data assistants (PDA's), cameras, music players and printers. The USB bus supports a host-peripheral relationship between connected devices as opposed to a peer-to-peer relationship. A typical USB electronic network 10 is shown in FIG. 1. The personal computer is always designated as the host device and the PC connected devices are always designated as the peripheral devices. Stated in terms of logical topology, USB networks exhibit a one-to-many relationship as opposed to a one-to-one relationship; the PC being "one" and the peripheral devices the "many". Because the USB specification includes no more than one host in any USB connected network, current USB connectors and cables make no physical distinction between the host connectors and the peripheral connectors. Thus, an underlying assumption of USB networks is that the user of the network can easily distinguish between a host device and a peripheral device.

However, it is easy to select three common devices such as a PC, a PDA that is an intelligent portable computer, and a USB peripheral such as a printer in which the lack of gender of the USB connector can cause significant confusion. FIG. 2 illustrates the problem of one USB host 20 connected to a plurality of peripherals 22 and 24. As is shown in FIG. 2, suppose a user wishes to connect the PC 20 to the PDA 22. In this case, the PDA 22 is a USB peripheral and its USB signals must respond as a USB peripheral device 20 and be handled by USB peripheral software drivers and USB peripheral interface logic. Now suppose the user wishes to connect the PDA 22 to a USB printer. In this case the PDA 22 must be a USB host and its USB signals must respond as a USB 20 host and be handled by USB host software drivers and USB host interface logic. The inability of the PDA 22 to know how its USB signals should be treated is caused by the lack of host/peripheral gender of the USB connector and the basic one-to-many relationship of the USB network.

A new initiative called USB on-the-go (OTG) is an attempt to provide a solution to the problem of designating which end of the USB cable is a host or a peripheral. OTG does this by adding new software to the USB enumeration layer and defining a new USB fifth pin labeled VDIR to the four standard USB pin definitions of D+, D−, VCC and GND. The OTG effort does solve the USB connector gender problem but at the expense of added software, new types of cables and connectors, and a new pin definition VDIR. What is needed is a system and method to overcome the above-identified problems. The present invention addresses this need.

SUMMARY OF THE INVENTION

A dual port USB interface is disclosed. The dual port interface comprises a USB host port and a USB peripheral port. The host port and the peripheral port are defined using predetermined signals. In a preferred embodiment the dual port USB interface is utilized in a network where at least one dual port USB (DPUSB) connector is connected to either standard USB connectors or other DPUSB connectors. By use of the DPUSB interface, a single device in a network can act as both a host or a peripheral to other devices as well create network peer-to-peer relationships. Use of DPUSB connectors also provides the opportunity of new types of devices such as memory cards and cables that will greatly increase the ease of use of many intelligent electronic devices such as cameras and PDA's.

DETAILED DESCRIPTION

The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

The Dual Port USB Solution

Figure 1:
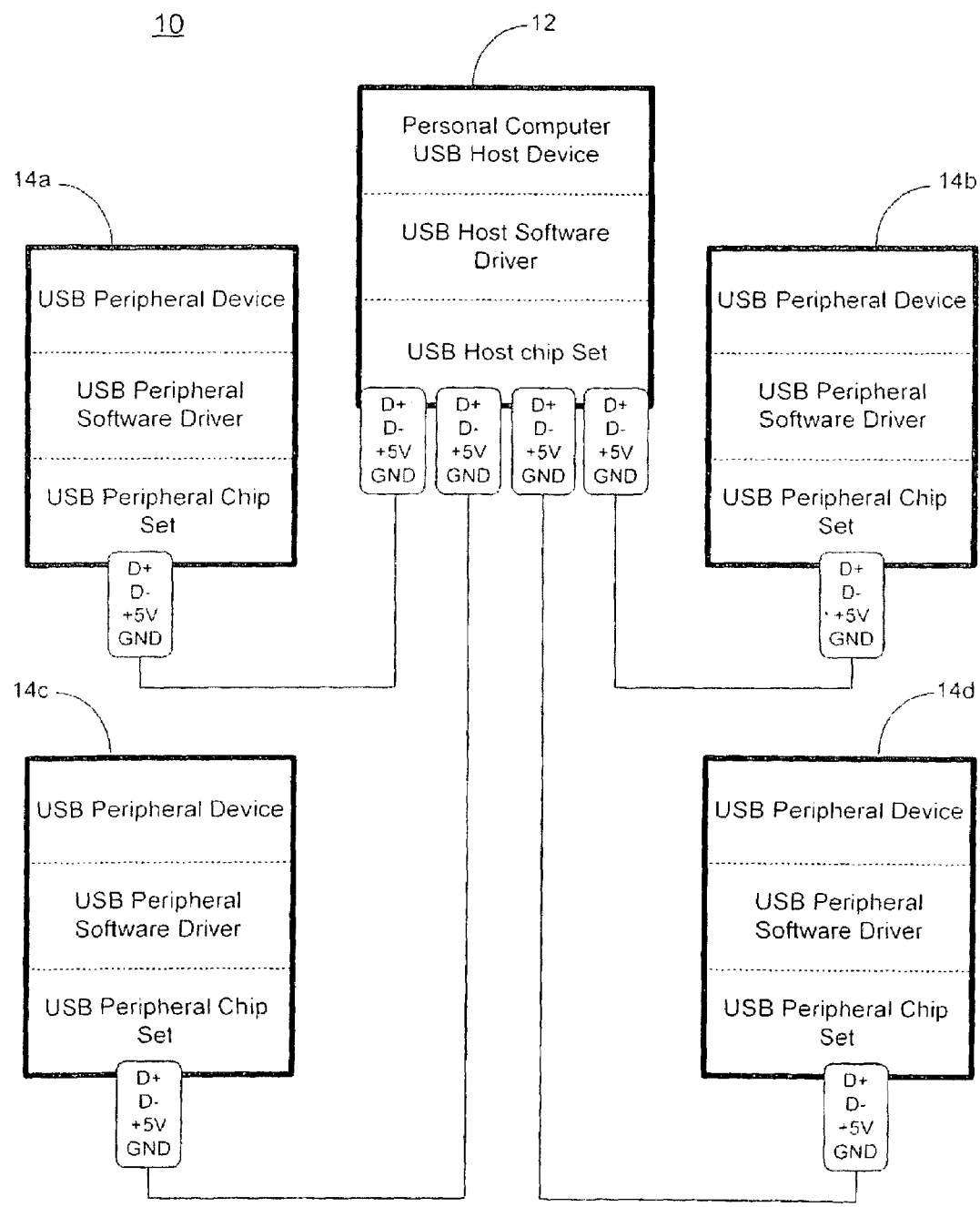
FIG. 1 illustrates a typical USB network.
Figure 2:
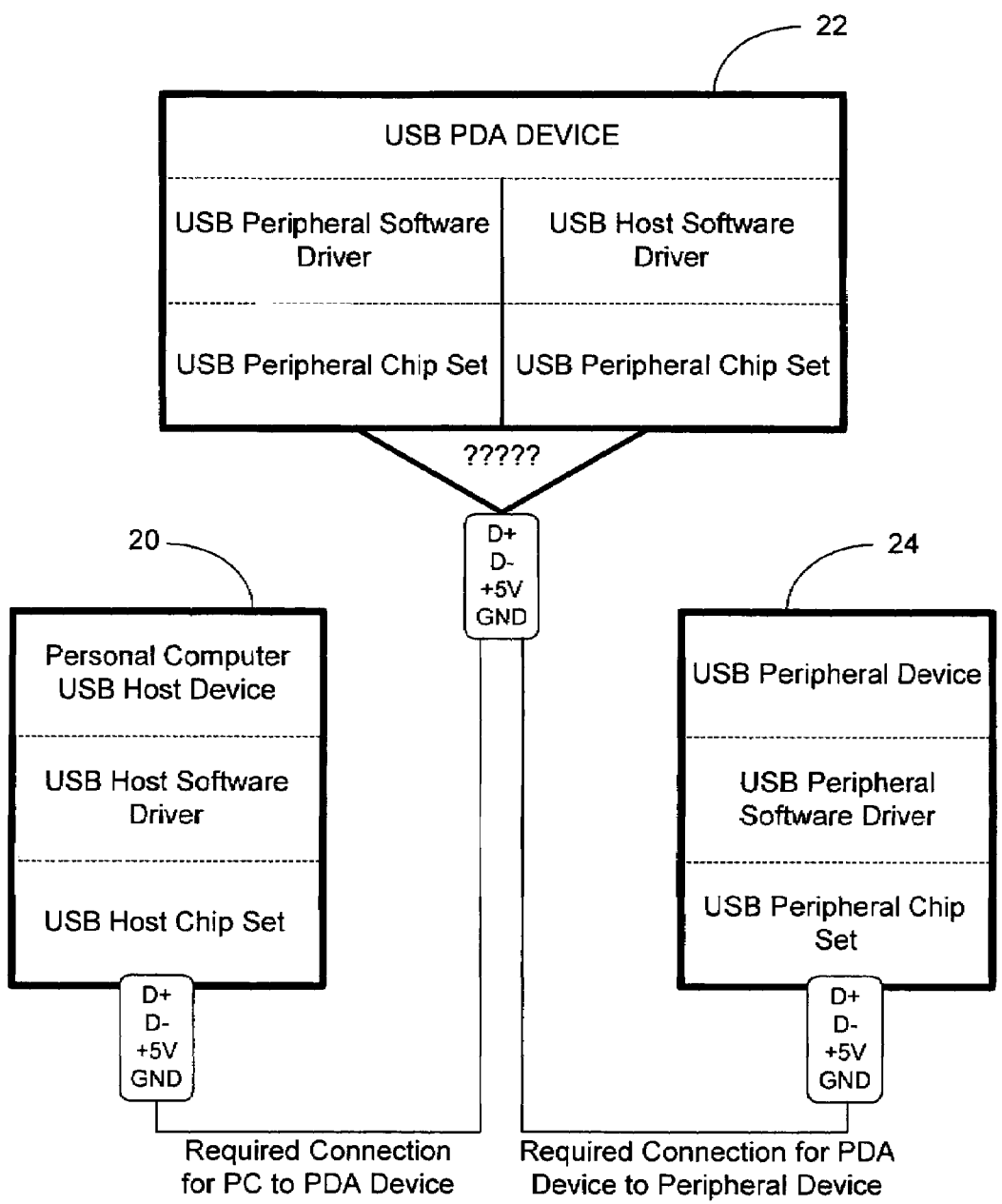
FIG. 2 illustrates the problem of one USB host connected to a plurality of peripherals.
Figure 3:
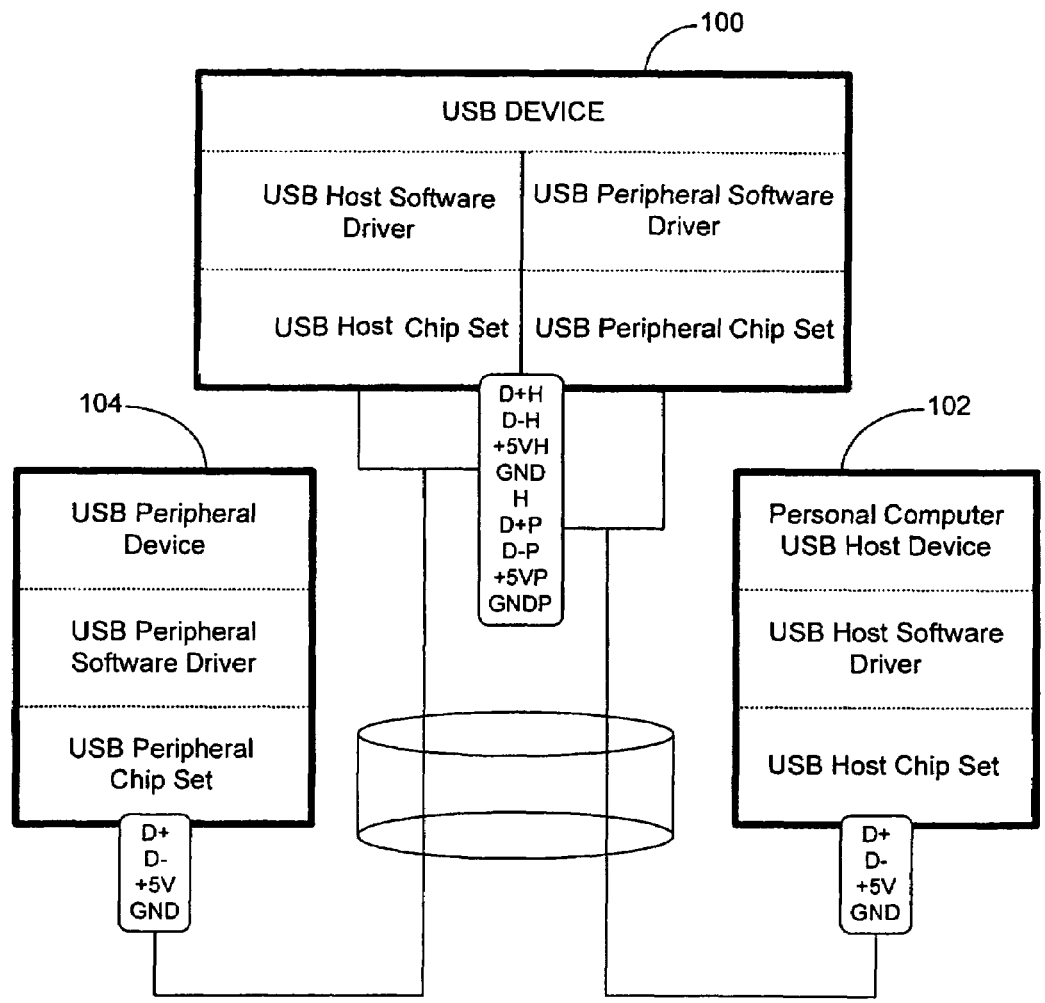
FIG. 3 illustrates a DPUSB connector and cable solution in accordance with the present invention.

The confusion of the host/peripheral assignment inherent in a standard USB connection is caused by the one-to-many topology of the USB network and the USB connector pins definitions. However, there is no host/peripheral confusion existing in the USB software driver or in the USB interface electronics that couple the system CPU to the USB port. FIG. 3 illustrates the DPUSB connector and cable connection solution 100 in accordance with the present invention coupled to a USB peripheral device 104 and personal computer host device 102. Therefore, an elegant solution to the problem is to create a new USB interface having both a host and a peripheral port in the same connector (FIG. 3) which we designate as a dual port USB (DPUSB) connector 100.

The default signals in the DPUSB interface are D+H, D−H, D+P, D−P, GNDH, GNDP, +5VH, and +5VP. The D+H and D−H are the host differential data lines. The D+P and D−P are the peripheral differential data lines. The GNDH and +5VH are the host power lines. And the GNDP and +5VP are the peripheral power lines.

Other pin assignments are possible which combine the GND pins or eliminate one of the VCC pins. It is also possible to add additional pins to take care of special functions of a USB device such as device detect pins and memory write protect pins. This is only a brief listing of optional added function pins, as many other possibilities exist. However, what distinguishes a DPUSB interface from some other combination of possible modified USB connections is that on every DPUSB connector both the host and peripheral data ports are defined using the signals D+H, D–H, and D+P, D–P.

DPUSB and Existing USB Connectors

The DPUSB connector 100 retrofits easily with current USB connectors (FIG. 3) using a suitable DPUSB to USB cable. A simple color code and symbol label at the DPUSB cable end can identify whether the host or peripheral ports are connected. Optionally, since there are equal number of pins assigned to both the host and peripheral ports, it is possible to design a DPUSB connector that allows a reversal of the DPUSB plug to connect either the host or peripheral ports.

DPUSB to DPUSB Connections

Figure 4:
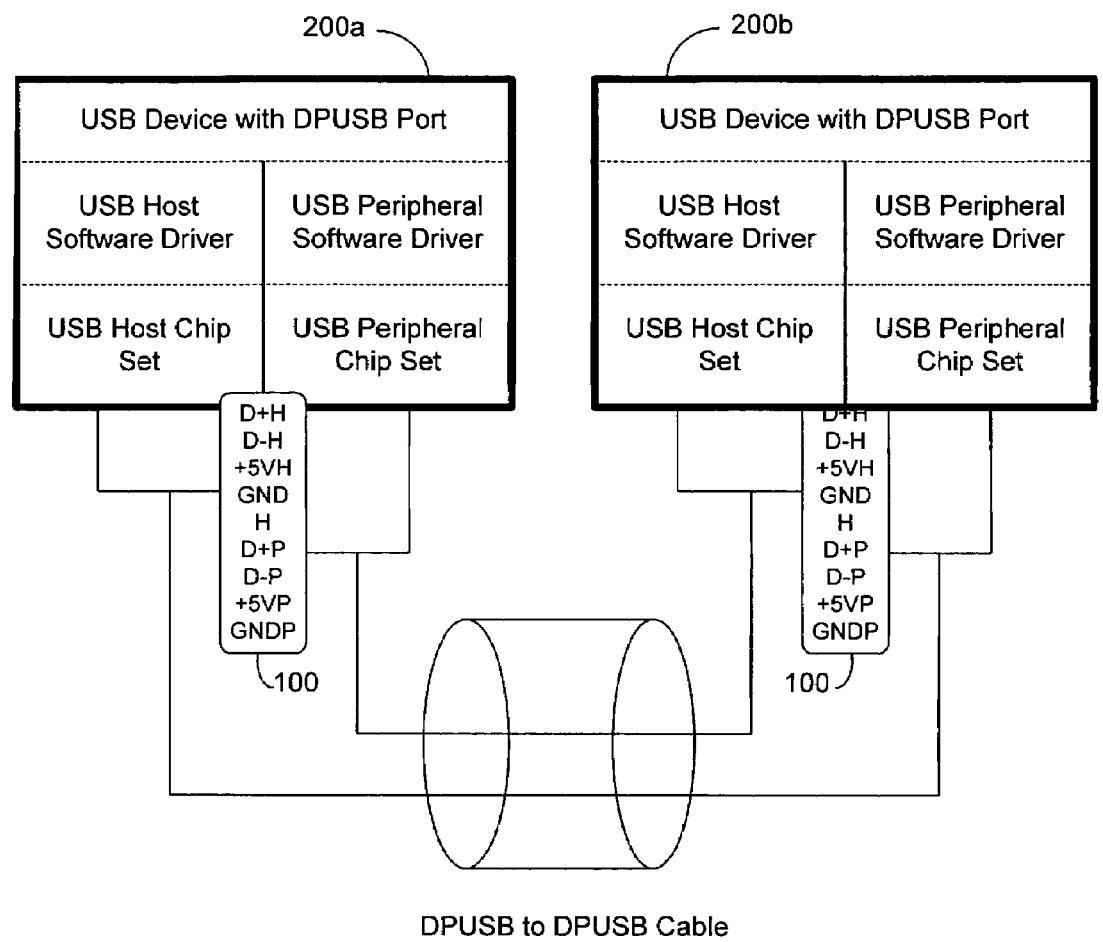
FIG. 4 illustrates connecting two devices with DPUSB connectors and both host and peripheral active ports.
Figure 5:
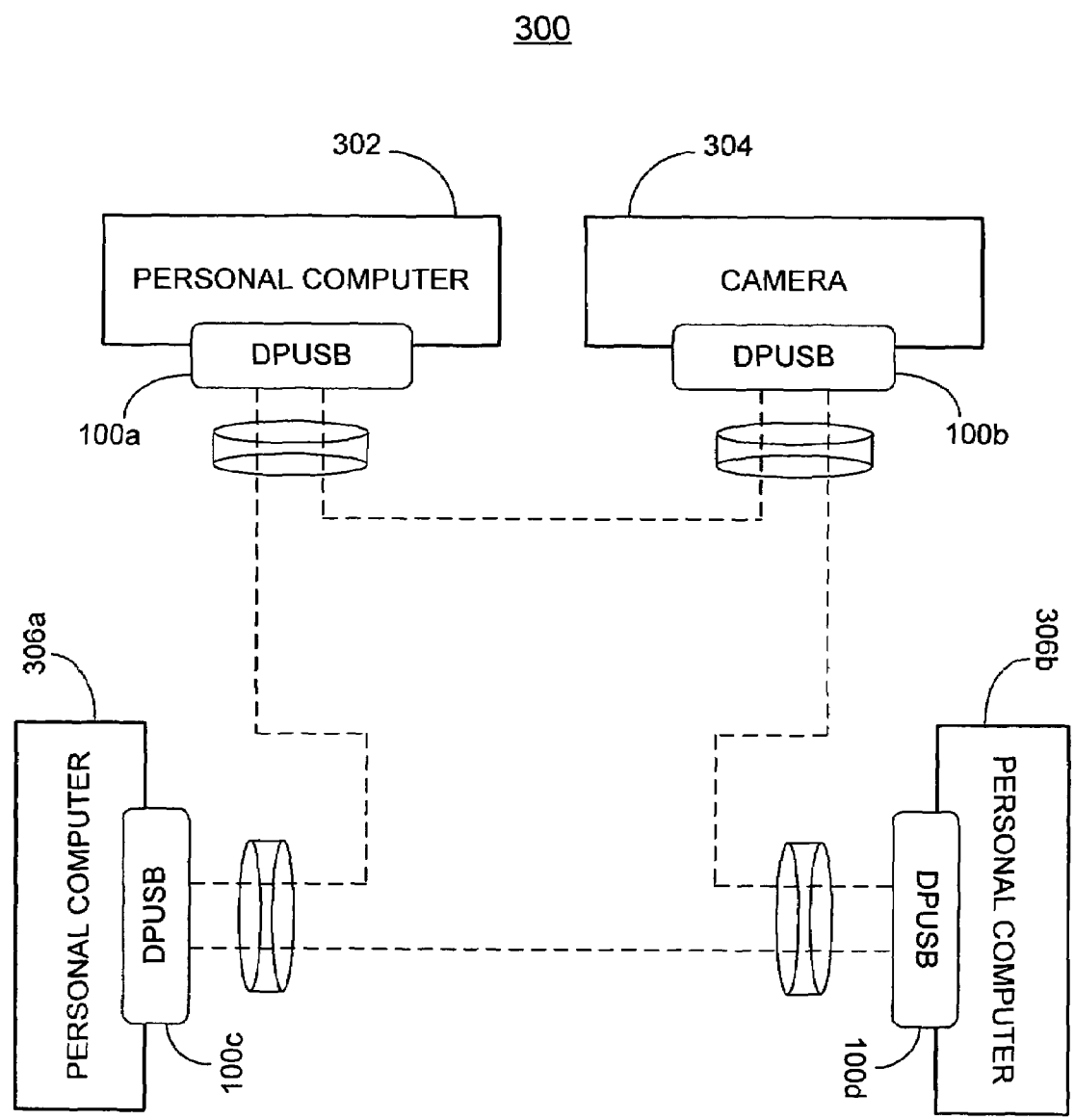
FIG. 5 illustrates DPUSB connectors creating a USB peer-to-peer network.

If two or more USB devices with DPUSB connectors also have active host and peripheral circuitry and software, then the two devices can communicate together through two channels at the same time. This can be useful using today's multiprocessing, interrupt driven operating systems and their complex applications. This topology of multiple host/peripheral connections creates a pseudo peer-to-peer relationship between the two devices as shown in FIG. 4 and FIG. 5. FIG. 4 illustrates connecting two devices 200a and 200b with DPUSB connectors 100 and both host and peripheral active ports. FIG. 5 illustrates DPUSB connectors 100a-100d creating a USB peer-to-peer network between a personal computer 302, camera 304, personal computer 306a and personal computer 306b.

New Devices Created With DPUSB Connectors

Figure 6:
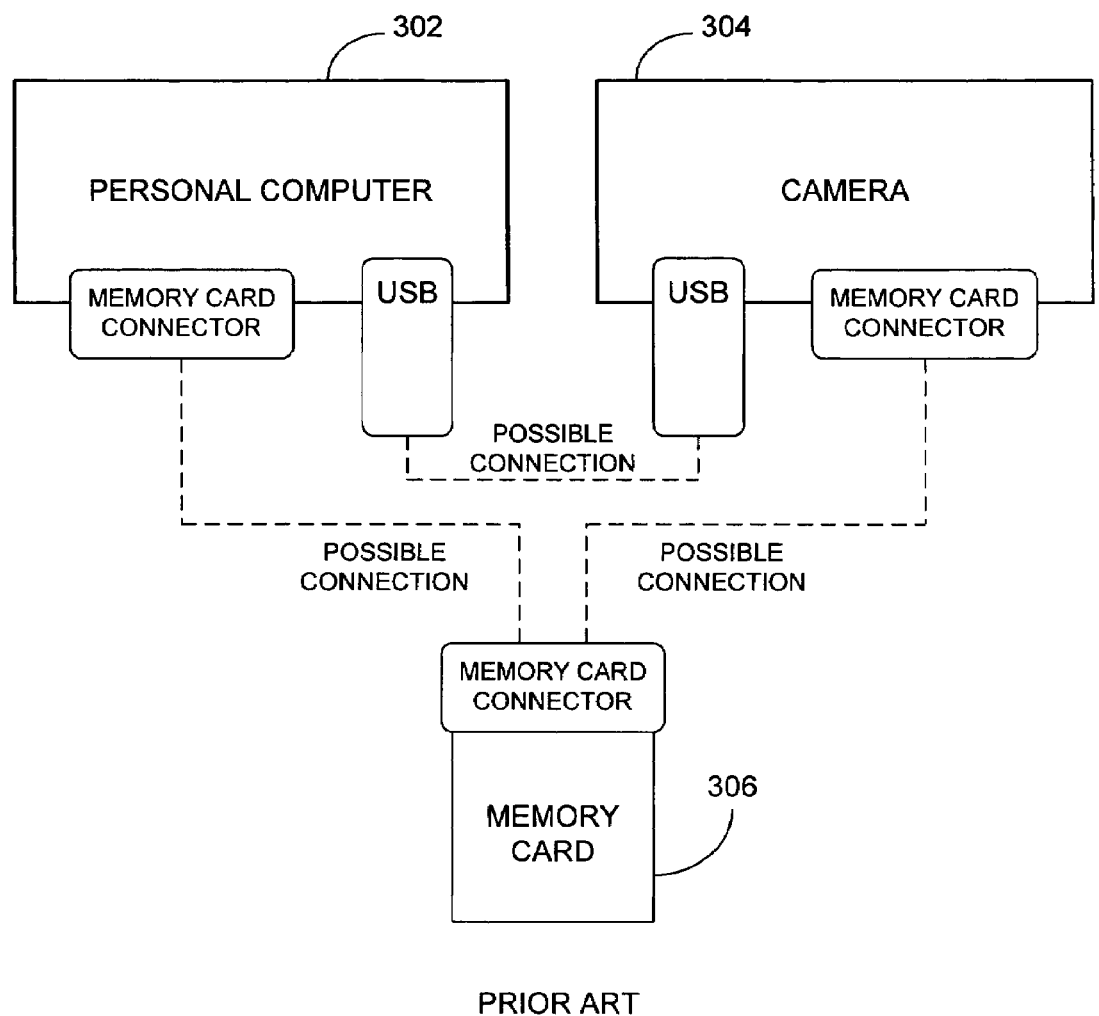
FIG. 6 illustrates typical multiple connections and connectors now required for cameras and PCs.
Figure 7:
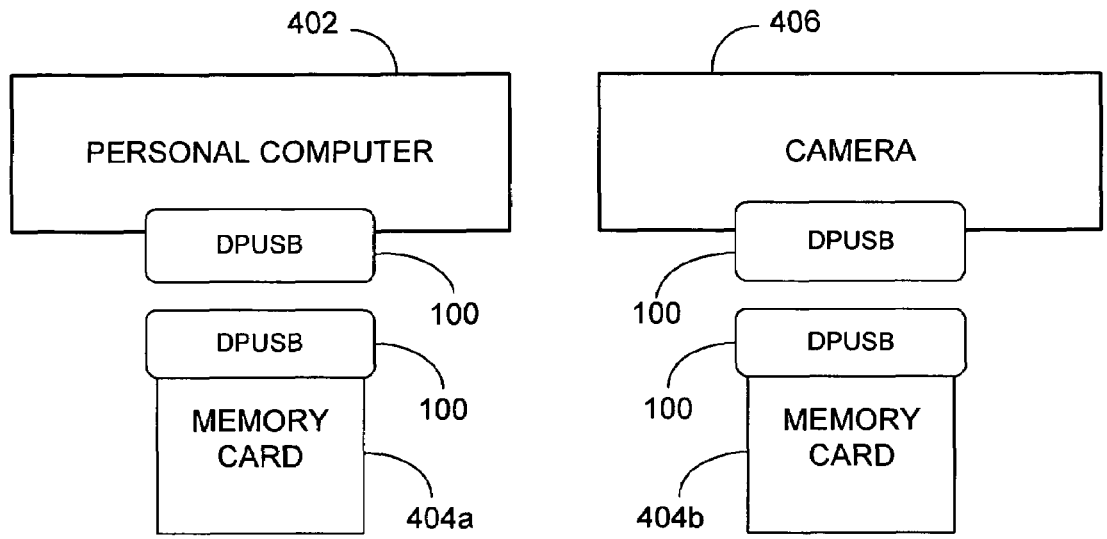
FIG. 7 illustrates DPUSB connectors creating new device connections.

Another use of DPUSB connectors is the elimination of multiple types of I/O connections in devices such as cameras. FIG. 6 illustrates multiple connections and connectors conventionally required for a camera 304 and a PC 306. For example, consider three devices such as a PC, a digital camera, and a memory card. Since digital cameras require a connection to both a PC and a memory card, they are normally made with two physical I/O ports: namely one for connection to the PC and one for connection to the memory card as in FIG. 5. Also, since PCs sometimes require connection to the camera and/or the memory card, the PC may also require both types of connectors. FIG. 7 illustrates DPUSB connectors creating new device connections between a memory card 404a and a personal computer and memory card 404 and a camera. If the camera 406 and the memory card 404b are both built with DPUSB connectors, the camera only needs one physical I/O port as seen in FIG. 7.

Figure 8:
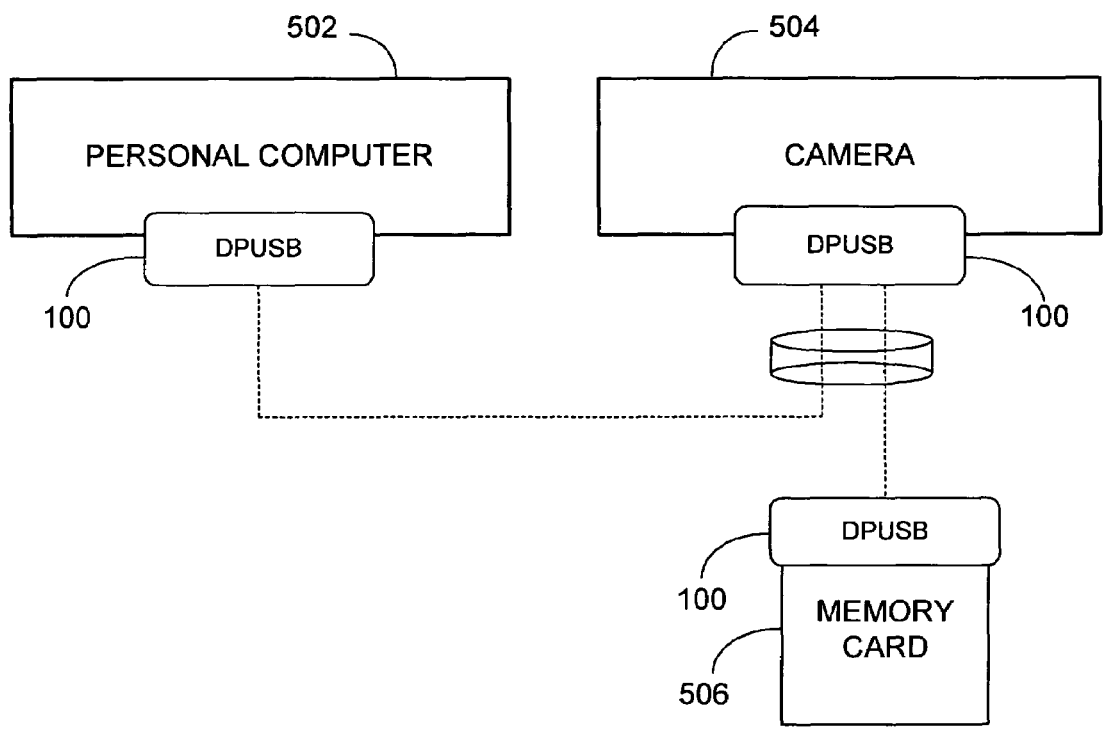
FIG. 8 illustrates DPUSB connectors eliminating multiple types of I/O ports using suitable DPUSB cables.

With suitably designed DPUSB connectors and DPUSB cables, the connections of camera-to-memory card 506; PC-to-memory card 502, PC-to-camera-to-memory card 504 can all be easily done (FIG. 8). FIG. 8 illustrates DPUSB connectors 100 eliminating multiple types of I/O ports using suitable DPUSB cables.

CONCLUSION

The DPUSB interface solves the connection ambiguities that have arisen using standard USB connectors and cables. Connectors using the DPUSB interface also provide the means for new types of application software to be written by allowing both host and peripheral driver functions to reside on both sides of every DPUSB-to-DPUSB connection. And DPUSB connectors provide these added benefits without requiring any new USB functional pin definitions in standard USB connectors or new USB software driver definitions or hardware driver definitions. Use of the DPUSB interface also provides the opportunity of new types of devices such as memory cards and cables that will greatly increase the ease of use of many intelligent electronic devices such as cameras and PDA's.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A single USB interface comprising:
a USB root hub host port coupled to a first USB bus; and
a USB peripheral port coupled to a second USB bus wherein the USB peripheral port and the USB root hub host port are both active at the same time, wherein the USB root hub host port and the USB peripheral port are defined using predetermined signals.

2. The interface of claim 1 wherein two connected devices utilizing the single USB interface can have a peer-to-peer connection via the USB root hub host port and the USB peripheral port.

3. The interface of claim 1 wherein two connected devices utilizing the single USB interface can have a one-to-many relationship via either the USB root hub host port and/or the USB peripheral port.

4. The USB interface of claim 1 wherein a device incorporating the USB interface is able to communicate with a second USB device using only one I/O USB port of the second device.

5. The interface of claim 1 wherein the predetermined signals comprise host differential data lines and peripheral differential data lines.

6. A device comprising:
a processor; and
a single USB interface, the interface comprising a USB root hub host port coupled to a first USB bus; and
a USB peripheral port coupled to a second USB bus wherein the USB root hub host port and the USB peripheral port are defined using predetermined signals and wherein the USB root hub port and the USB peripheral port are both active at the same time.

7. The device or claim 6 wherein the single USB interface requires a connection to only one physical I/O port of a second device and this physical I/O port can be either a USB host port or a USB peripheral port which is defined using the predetermined signals.

8. The device of claim 6 wherein the predetermined signals comprise host differential data lines and peripheral differential data lines.

* * * * *